United States Patent
Banerjee et al.

(10) Patent No.: US 9,767,548 B2
(45) Date of Patent: Sep. 19, 2017

(54) OUTLIER DETECTION ON PATTERN OF INTEREST IMAGE POPULATIONS

(71) Applicant: KLA-Tencor Corporation, Milpitas, CA (US)

(72) Inventors: Saibal Banerjee, Fremont, CA (US); Ashok V. Kulkarni, San Jose, CA (US)

(73) Assignee: KLA-Tencor Corp., Milpitas, CA (US)

( * ) Notice: Subject to any disclaimer, the term of this patent is extended or adjusted under 35 U.S.C. 154(b) by 0 days.

(21) Appl. No.: 15/135,465

(22) Filed: Apr. 21, 2016

(65) Prior Publication Data

US 2016/0314578 A1    Oct. 27, 2016

Related U.S. Application Data

(60) Provisional application No. 62/152,472, filed on Apr. 24, 2015.

(51) Int. Cl.
*G06K 9/00*  (2006.01)
*G06T 7/00*  (2017.01)

(52) U.S. Cl.
CPC .... *G06T 7/001* (2013.01); *G06T 2207/20021* (2013.01); *G06T 2207/30148* (2013.01)

(58) Field of Classification Search
None
See application file for complete search history.

(56) References Cited

U.S. PATENT DOCUMENTS

| | | | | |
|---|---|---|---|---|
| 6,136,618 A | * | 10/2000 | Sanada | H01L 22/20 257/E21.525 |
| 7,034,298 B2 | * | 4/2006 | Miyai | H01J 37/265 250/306 |
| 7,248,353 B2 | * | 7/2007 | Kimba | G06T 7/001 356/237.4 |
| 7,425,704 B2 | * | 9/2008 | Miyai | H01J 37/265 250/306 |
| 7,570,796 B2 | | 8/2009 | Zafar et al. | |
| 7,664,608 B2 | * | 2/2010 | Urano | G01N 21/4738 356/237.1 |
| 7,676,077 B2 | | 3/2010 | Kulkarni et al. | |
| 7,711,514 B2 | * | 5/2010 | Park | G05B 23/0221 382/145 |

(Continued)

OTHER PUBLICATIONS

International Search Report for PCT/US2016/0290236 mailed on Jul. 19, 2016.

(Continued)

*Primary Examiner* — Feng Niu
(74) *Attorney, Agent, or Firm* — Ann Marie Mewherter

(57) ABSTRACT

Methods and systems for identifying outliers in multiple instances of a pattern of interest (POI) are provided. One system includes one or more computer subsystems configured for acquiring images generated by an imaging subsystem at multiple instances of a POI within a die formed on the specimen. The multiple instances include two or more instances that are located at aperiodic locations within the die. The computer subsystem(s) are also configured for determining a feature of each of the images generated at the multiple instances of the POI. In addition, the computer subsystem(s) are configured for identifying one or more outliers in the multiple instances of the POI based on the determined features.

30 Claims, 6 Drawing Sheets

(56) References Cited

U.S. PATENT DOCUMENTS

| | | | | |
|---|---|---|---|---|
| 7,769,225 B2 * | 8/2010 | Kekare | ............ | G01N 21/95607 356/237.4 |
| 7,848,563 B2 * | 12/2010 | Sakai | ........................ | G06T 7/001 382/144 |
| 7,855,363 B2 * | 12/2010 | Miyai | .................... | H01J 37/265 250/306 |
| 8,139,843 B2 * | 3/2012 | Kulkarni | ............. | G06F 17/5045 382/144 |
| 8,213,704 B2 * | 7/2012 | Peterson | .................... | G03F 1/84 356/237.4 |
| 8,274,652 B2 * | 9/2012 | Urano | ................. | G01N 21/9501 356/237.2 |
| 8,340,395 B2 * | 12/2012 | Sakai | ................. | G01N 21/9501 382/149 |
| 8,467,594 B2 * | 6/2013 | Sakai | ....................... | G06T 7/001 382/149 |
| 8,494,802 B2 * | 7/2013 | Chen | ................... | G01N 21/9501 324/457 |
| 8,559,001 B2 * | 10/2013 | Chang | ................... | G01N 21/9501 250/559.3 |
| 8,664,594 B1 | 3/2014 | Jiang et al. | | |
| 8,692,204 B2 | 4/2014 | Kojima et al. | | |
| 8,698,093 B1 | 4/2014 | Gubbens et al. | | |
| 8,716,662 B1 | 5/2014 | MacDonald et al. | | |
| 8,755,041 B2 * | 6/2014 | Urano | ..................... | G06T 7/001 356/237.3 |
| 8,824,774 B2 * | 9/2014 | Sakai | ....................... | G06T 7/001 382/149 |
| 9,075,026 B2 * | 7/2015 | Urano | ................. | G01N 21/9501 |
| 9,619,876 B2 * | 4/2017 | Huang | ................... | G06T 7/0004 |
| 2007/0133860 A1 | 6/2007 | Lin et al. | | |
| 2007/0288219 A1 * | 12/2007 | Zafar | ........................ | G03F 1/84 703/14 |
| 2009/0055783 A1 | 2/2009 | Florence et al. | | |
| 2011/0170091 A1 | 7/2011 | Chang et al. | | |
| 2011/0196639 A1 * | 8/2011 | Chen | ................... | G01N 21/9501 702/108 |
| 2011/0276935 A1 | 11/2011 | Fouquet et al. | | |
| 2011/0311126 A1 * | 12/2011 | Sakai | ..................... | G01N 21/47 382/149 |
| 2013/0294677 A1 * | 11/2013 | Urano | .................. | G01N 21/956 382/141 |
| 2013/0329039 A1 * | 12/2013 | Sakai | .................. | G01N 21/9501 348/126 |
| 2014/0002632 A1 * | 1/2014 | Lin | ..................... | G01N 21/8851 348/87 |
| 2014/0105482 A1 | 4/2014 | Wu et al. | | |
| 2015/0356727 A1 * | 12/2015 | Urano | .................. | G01N 21/956 382/149 |
| 2016/0116420 A1 | 4/2016 | Duffy et al. | | |

OTHER PUBLICATIONS

Written Opinion for PCT/US2016/0290236 mailed on Jul. 19, 2016.
A. Rosenfeld and A. C. Kak, Digital Picture Processing, 2nd ed., vol. 2, San Diego: Academic Press, Inc., 1982.
A. N. Langville and C. D. Meyer, Who's #1?: The science of rating and ranking, Princeton: Princeton University Press, 2012.
P. Diaconis and R. L. Graham, "Spearman's Footrule as a Measure of Disarray," Journal of the Royal Statistical Society. Series B (Methodological), vol. 39, No. 2, pp. 262-268, 1977.
T. H. Carmen, C. E. Leiserson, R. L. Rivest and C. Stein, Introduction to Algorithms, Cambridge: The MIT Press, 2009.

* cited by examiner

OUTLIER DETECTION ON PATTERN OF INTEREST IMAGE POPULATIONS

BACKGROUND OF THE INVENTION

1. Field of the Invention

The present invention generally relates to methods and systems for outlier detection on pattern of interest image populations.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-meehanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices such as ICs. However, as the dimensions of semiconductor devices decrease, inspection becomes even more important to the successful manufacture of acceptable semiconductor devices because smaller defects can cause the devices to fail.

As design rules shrink, however, semiconductor manufacturing processes may be operating closer to the limitations on the performance capability of the processes. In addition, smaller defects can have an impact on the electrical parameters of the device as the design rules shrink, which drives more sensitive inspections. Therefore, as design rules shrink, the population of potentially yield relevant defects detected by inspection grows dramatically, and the population of nuisance defects detected by inspection also increases dramatically. Therefore, more and more defects may be detected on the wafers, and correcting the processes to eliminate all of the defects may be difficult and expensive.

Recently, inspection systems and methods are increasingly being designed to focus on the relationship between defect and design since it is the impact on the design for a wafer that will determine whether and how much a defect matters. For example, some methods have been developed for focusing the inspection on only certain portions of the design printed on the wafer. Those portions of the design may be commonly referred to as "patterns of interest" (POIs).

Currently, POI monitoring may be carried out as an extension of the die-to-die difference strategy employed by current wafer inspection systems for finding defects on semiconductor wafers. In this strategy, outlier detection may be performed by taking the difference between the POI on the so-called reference die and the test die. So long as the defect being searched for does not have a common mode that cancels in the difference between the reference and the test images of the POI, this is a sensible way of performing outlier detection.

There can be, however, a number of disadvantages to the above-described methods for POI-based defect detection. For example, it is impossible to perform outlier detection when common mode defect mechanisms cancel out in the difference between the reference and test images of the POI. In addition, it is impossible to perform intra-die inspections with the current methodology of analyzing differences between adjacent dies, which by definition must involve a plurality of dies. Furthermore, it is a time-consuming manual task to identify the POIs and what geometrical measures are to be performed on the design structures in a particular POI.

Accordingly, it would be advantageous to develop systems and methods for identifying outliers in multiple instances of a POI that do not have one or more of the disadvantages described above.

SUMMARY OF THE INVENTION

The following description of various embodiments is not to be construed in any way as limiting the subject matter of the appended claims.

One embodiment relates to a system configured to identify outliers in multiple instances of a pattern of interest (POI) on a specimen. The system includes an imaging subsystem that includes at least an energy source and a detector. The energy source is configured to generate energy that is directed to a specimen. The detector is configured to detect energy from the specimen and to generate images responsive to the detected energy. The system also includes one or more computer subsystems configured for acquiring images generated by the imaging subsystem at multiple instances of a POI within a die formed on the specimen. The multiple instances include two or more instances that are located at aperiodic locations within the die. The one or more computer subsystems are also configured for determining a feature of each of the images generated at the multiple instances of the POI. In addition, the one or more computer subsystems are configured for identifying one or more outliers in the multiple instances of the POI based on the determined features. The system may be further configured as described herein.

Another embodiment relates to a computer-implemented method for identifying outliers in multiple instances of a POI on a specimen. The method includes the steps described above. The steps of the method are performed by one or more computer systems. Each of the steps of the method described above may be further performed as described further herein. In addition, the embodiment of the method described above may include any other step(s) of any other method(s) described herein. Furthermore, the method described above may be performed by any of the systems described herein.

Another embodiment relates to a non-transitory compr-readable medium storing program instructions executable on a computer system for performing a computer-implemented method for identifying outliers in multiple instances of a POI on a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
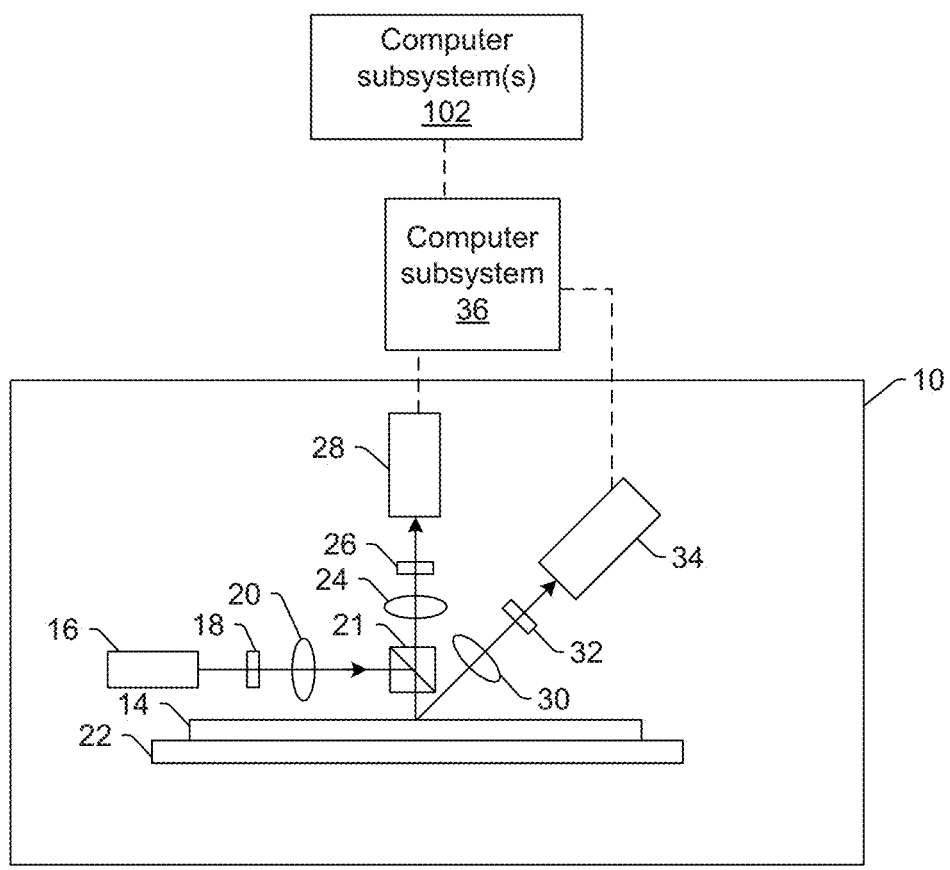
FIGS. 1 and 2 are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design" and "design data" as used herein generally refer to the physical design (layout) of an IC and data derived from the physical design through complex simulation or simple geometric and Boolean operations. The physical design may be stored in a data structure such as a graphical data stream (GUS) file, any other standard machine-readable file, any other suitable file known in the art, and a design database. A GDSII file is one of a class of files used for the representation of design layout data. Other examples of such files include GL1 and OASIS files and proprietary file formats such as RDF data, which is proprietary to KLA-Tencor, Milpitas, Calif. In addition, an image of a reticle acquired by a reticle inspection system and/or derivatives thereof can be used as a "proxy" or "proxies" for the design. Such a reticle image or a derivative thereof can serve as a substitute for the design layout in any embodiments described herein that use a design. A high resolution image of a local area on a wafer acquired by a high resolution review system like a scanning electron microscope (SEM) based review system, and/or derivatives thereof can also serve as a substitute for the local design in that area. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

In some instances, simulated or acquired images from a wafer or reticle can be used as a proxy for the design. Image analysis can also be used as a proxy for design analysis. For example, polygons in the design may be extracted from an image of a design printed on a wafer and/or reticle, assuming that the image of the wafer and/or reticle is acquired with sufficient resolution to adequately image the polygons of the design. In addition, the "design" and "design data" described herein refers to information and data that is generated by semiconductor device designers in a design process and is therefore available for use in the embodiments described herein well in advance of printing of the design on any physical wafers.

Preferably, the "design" or "physical design" as those terms are used herein refer to the design as it would be ideally formed on the specimen—the "design intent". For example, a design or physical design described herein would preferably not include features of the design that would not be printed on a wafer such as optical proximity correction (OPC) features and Sub-Resolution Assist Features (SRAF), which are added to the design intent to enhance printing of the features on the wafer without actually being printed themselves. In this manner, in some embodiments, the design for the specimen used for the steps described further herein does not include features of the design that will not be printed on the specimen.

Turning now to the drawings, it is noted that the figures are not drawn to scale. In particular, the scale of some of the elements of the figures is greatly exaggerated to emphasize characteristics of the elements. It is also noted that the figures are not drawn to the some scale. Elements shown in more than one figure that may be similarly configured have been indicated using the same reference numerals. Unless otherwise noted herein, any of the elements described and shown may include any suitable commercially available elements.

In general, the embodiments described herein are configured for outlier detection on pattern of interest (POI) image populations. The embodiments described herein can be used to improve and facilitate the monitoring of certain yield critical and failure prone design patterns on a semiconductor wafer or another specimen in a fab or foundry through the judicious use of image data from a specimen inspection tool (or other image generating system) coupled with use of design data describing the circuit pattern on the specimen (e.g., wafer layer) being inspected. This monitoring will allow the fabs and foundries to find yield problems related to the outlier data (i.e., defects) caught at these critical POI. The defects at these POIs are assumed to be caused by faulty design, lithographic, or semiconductor manufacturing processes (as opposed to external "fall-on" defects and catching them will reduce overall production costs if appropriate and expedient countermeasures are taken.

One embodiment therefore relates to a system configured to identify outliers in multiple instances of a POI on a specimen. In one embodiment, the specimen includes a wafer. In another embodiment, the specimen includes a reticle. The wafer and the reticle may include any water and reticle known in the art.

One embodiment of such a system is shown in FIG. 1. The system includes an imaging subsystem that includes at least an energy source and a detector. The energy source is configured to generate energy that is directed to a specimen.

The detector is configured to detect energy from the specimen and to generate images responsive to the detected energy.

In one embodiment, the energy directed to the specimen includes light, and the energy detected from the specimen includes not. For example, in the embodiment of the system shown in FIG. 1, imaging subsystem 10 includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to beam litter 21, which directs the light to specimen 14 at a normal angle of incidence. The angle of incidence may include any suitable angle of incidence, which may vary depending on, for instance, characteristics of the specimen and the defects to be detected on the specimen.

The illumination subsystem may be configured to direct the light to the specimen at different angles of incidence at different times. For example, the imaging subsystem may be configured to alter one or more characteristics of one or more elements of the illumination subsystem such that the light can be directed to the specimen at an angle of incidence that is different than that shown in FIG. 1. In one such example, the imaging subsystem may be configured to move light source 16, optical element 18, and lens 20 such that the light is directed to the specimen at a different angle of incidence.

In some instances, the imaging subsystem may be configured to direct light to the specimen at more than one angle of incidence at the same time. For example, the illumination subsystem may include more than one illumination channel, one or the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing the light having different or the same characteristics to the specimen at different or the same angles of incidence sequentially or simultaneously.

In one embodiment, light source 16 may include a broadband plasma (BBP) light source. In this manner, the light generated by the light source and directed to the specimen may include broadband light. However, the light source may include any other suitable light source such as a laser. The laser may include any suitable laser known in the art and my be configured to generate light at any suitable wavelength or wavelengths known in the art. In addition, the laser may be configured to generate light that is monochromatic or nearly-monochromatic. In this manner, the laser may be a narrow-band laser. The light source may also include a polychromatic light source that generates light at multiple discrete wavelengths or wavebands.

Light from optical element 18 may be focused to beam splitter 1 by lens 20. Although lens 20 is shown in FIG. 1 as a single refractive optical element, it is to be understood that, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for imaging.

The imaging subsystem may also include a scanning subsystem configured to cause the light to be scanned over the specimen. For example, the imaging subsystem may include stage 22 on which specimen 14 is disposed during imaging. The scanning subsystem may include any suitable mechanical and/or robotic assembly (that includes stage 22) that can be configured to move the specimen such that the light can be scanned over the specimen. In addition, or alternatively, the imaging subsystem may be configured such that one or more optical elements of the imaging subsystem perform some scanning of the light over the specimen. The light may be scanned over the specimen in any suitable fashion.

The imaging subsystem further includes one or more detection channels. At least one of the one or more detection channels includes a detector configured to detect light from the specimen due to illumination of the specimen by the imaging subsystem and to generate images responsive to the detected light. For example, the imaging subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, one detection channel is configured to detect specularly reflected light, and the other detection channel is configured to detect light that is not specularly reflected (e.g., scattered, diffracted, etc.) from the specimen. However, two or more of the detection channels may be configured to detect the same type of light from the specimen (e.g., specularly reflected light). Although FIG. 1 shows an embodiment of the imaging subsystem that includes two detection channels, the imaging subsystem may include a different number of detection channels (e.g., only one detection channel or two or more detection channels). Although each of the collectors are shown in FIG. 1 as single refractive optical elements, it is to be understood that each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCDs), and time delay integration (TDI) cameras. The detectors may also include any other suitable detectors known in the art. The detectors may also include non-imaging detectors or imaging detectors. In this manner, if the detectors are non-imaging detectors, each of the detectors may be configured to detect certain characteristics of the light such as intensity but may not be configured to detect such characteristics as a function of position within the imaging plane. As such, the output that is generated by each of the detectors included in each of the detection channels of the imaging subsystem may be signals or data, but not image signals or image data. In such instances, a computer subsystem such as computer subsystem 36 of the system may be configured to generate images of the specimen from the non-imaging output of the detectors. However, in other instances, the detectors may be configured as imaging detectors that are configured to generate imaging signals or image data. Therefore, the system may be configured to generate the images described herein in a number of ways.

It is noted that FIG. 1 is provided herein to generally illustrate a configuration of an imaging subsystem that may be included in the system embodiments described herein. Obviously, the imaging subsystem configuration described herein may be altered to optimize the performance of the imaging subsystem as is normally performed when designing a commercial inspection system. In addition, the systems described herein may be implemented using an existing imaging subsystem (e.g., by adding functionality described herein to an existing inspection system) such as the 29xx/28xx series of tools that are commercially available from KLA-Tencor, Milpitas, Calif. For some such systems, the methods described herein may be provided as optional functionality of the system (e.g., in addition to other functionality of the system). Alternatively, the system described herein may be designed "from scratch" to provide a completely new system.

Computer subsystem 36 of the system may be coupled to the detectors of the imaging subsystem in any suitable manner (e.g., via one or more transmission media, which may include "wired" and/or "wireless" transmission media) such that the computer subsystem can receive the images generated by the detectors during scanning of the specimen. Computer subsystem 36 may be configured to perform a number of functions using the images generated by the detectors as described herein and any other functions described further herein. This computer subsystem may be further configured as described herein.

This computer subsystem (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 36 may be coupled to computer subsystem(s) 102 (as shown by the dashed line in FIG. 1) by any suitable transmission media, which may include any suitable wired and/or wireless transmission media known in the art. Two or more of such computer subsystems may also be effectively coupled by a shared computer-readable storage medium (not shown).

Although the imaging subsystem is described above as being an optical or light-based imaging subsystem, the imaging subsystem may be an electron beam-based imaging subsystem. For example, in one embodiment, the energy directed to the specimen includes electrons, and the energy detected from the specimen includes electrons. In this manner, the energy source may be an electron beam source. In one such embodiment shown in FIG. 2, the imaging subsystem includes electron column 122, which is coupled to computer subsystem 124.

Figure 2:
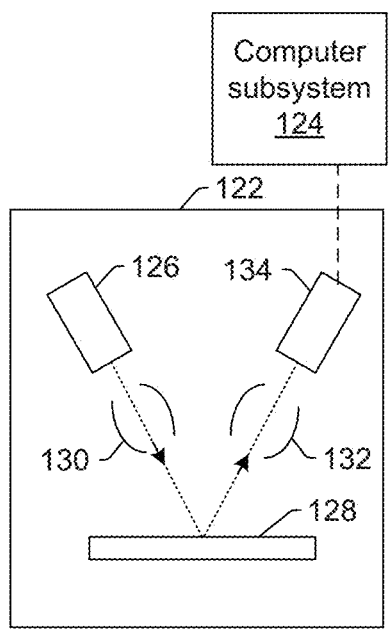

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al, U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam-based imaging subsystem may be configured to use multiple modes to generate images of the specimen (e.g., with different illumination angles, collection angles, etc.). The multiple modes of the electron beam-based imaging subsystem may be different in any image generation parameters of the imaging subsystem.

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform any of the functions described herein using the output of the detector and/or the electron beam images. Computer subsystem 124 may be configured to perform any additional step(s) described herein. A system that includes the imaging subsystem shown in FIG. 2 may be further configured as described herein.

It is noted that FIG. 2 is provided herein to generally illustrate a configuration of an electron beam-based imaging subsystem that may be included in the embodiments described herein. As with the optical imaging subsystem described above, the electron beam-based imaging subsystem configuration described herein may be altered to optimize the performance of the imaging subsystem as is normally performed when designing a commercial inspection system. In addition, the systems described herein may be implemented using an existing inspection system e.g., by adding functionality described herein to an existing inspection system such as the eSxxx series of tools that are commercially available from KLA-Tencor. For some such systems, the methods described herein may be provided as optional functionality of the system (e.g., in addition to other functionality of the system). Alternatively, the system described herein may be designed "from scratch" to provide a completely new system.

Although the imaging subsystem is described above as being a light-based or electron beam-based imaging subsystem, the imaging subsystem may be an ion beam-based imaging subsystem. Such an imaging subsystem may be configured as shown in FIG. 2 except that the electron beam source may be replaced with any suitable ion beam source known in the art. In addition, the imaging subsystem may be any other suitable ion beam-based imaging subsystem such as those included in commercially available focused ion beam (FIB) systems, helium ion microscopy (HIM) systems, and secondary ion mass spectroscopy (SIMS) systems.

The one or more computer subsystems included in the system embodiments described herein are configured for acquiring images generated by the imaging subsystem at multiple instances of a POI within a die formed on the specimen. For example, using a recipe, which as described herein may include information for locations of each POI in a die, the imaging subsystem scans the specimen and records images at those locations from one or more (or all) dies on the specimen. In this manner, the imaging subsystem may capture the POI image data at the POI locations determined as described further herein. That image data can then be acquired by the computer subsystem(s) as described further herein. The data that is used by the embodiments described herein may be digital image data, i.e., a two-dimensional (2D) array of numbers on each of its pixels. Each image may be a sample of one particular pattern called the POI on a specimen such as a semiconductor wafer, and all images may have the same dimensions. However, any form of images, images in multiple modes that are aligned to each other, measurements, a vector of measurements, etc. can be used as the images or in place of the images described herein.

Figure 3:
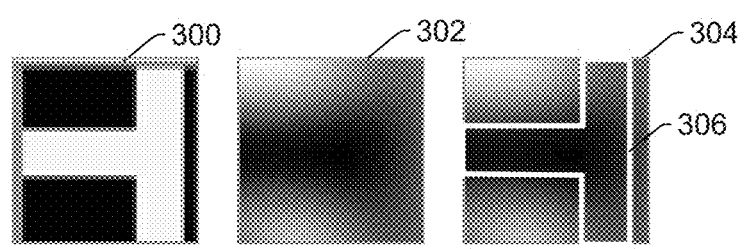
FIG. 3 is a schematic diagram illustrating a plan view of one embodiment of a pattern of interest (POI), a sub-image generated at an instance of the POI formed on a specimen, and the sub-image with information about the design of the POI overlaid thereon.

One specific POI is shown in FIG. 3. Binary image 300 shown in FIG. 3 shows a partial polygon in white, namely a T junction on its side, against a black background. The binary image 300 is generated from the design information of the wafer at the POI location. The actual layer of inspection may be a trench layer, i.e., the metal lines that the T represents are still to be filled in with metal. A sample of an optical inspection image of this POI is shown in image 302 in which the trench lines are darker than the surface. Once fine alignment is performed, which may be performed as described further herein, all the samples for this POI may closely resemble image 302 shown in FIG. 3. Overlay of the design polygon edges on the optical image is shown by lines 306 overlaid on image 304.

Figure 4:
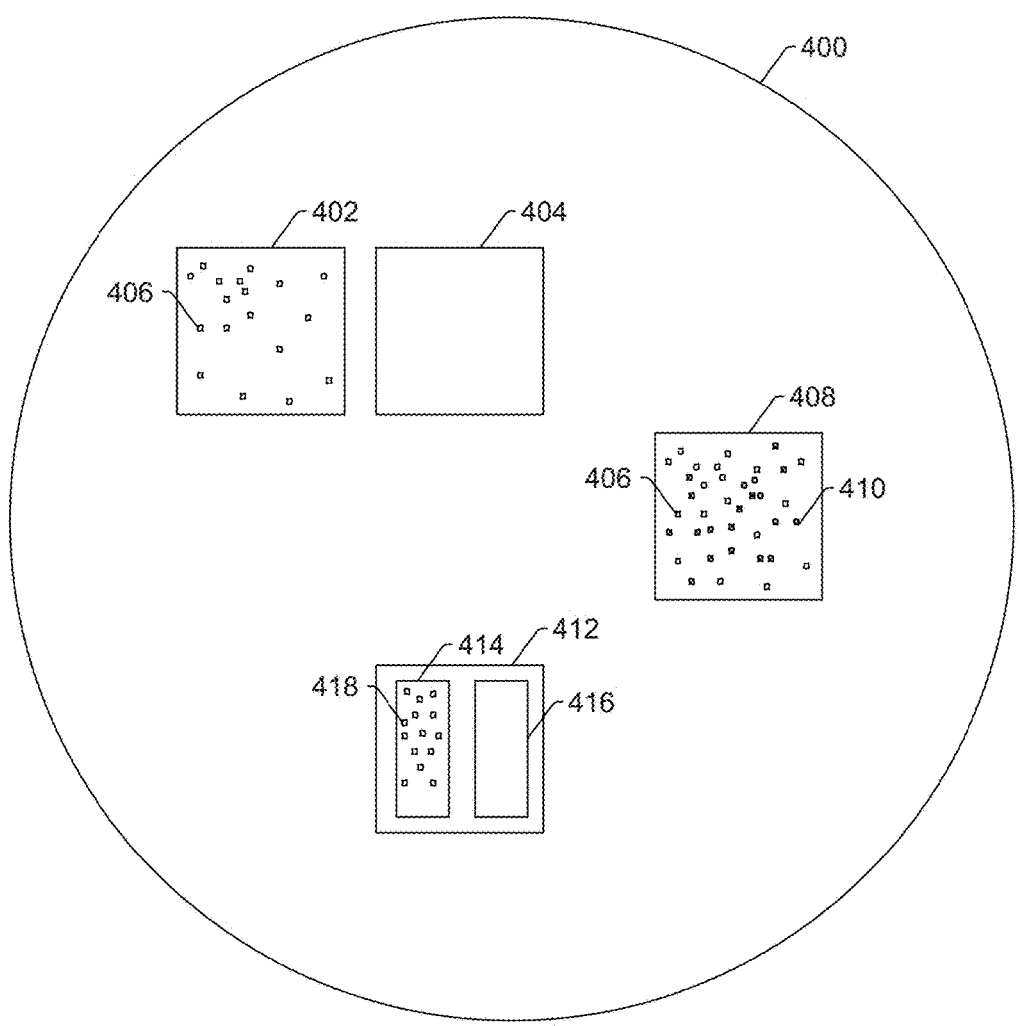
FIG. 4 is a schematic diagram illustrating a plan view of different embodiments of multiple instances of a POI or more than one POI formed within a die or a reticle field on a specimen.

The multiple instances include two or more instances that are located at aperiodic locations within the die. Different embodiments of multiple instances of the POIs are shown in FIG. 4. The specimen is shown in FIG. 4 as wafer 400. Although the embodiments are shown in FIG. 4 with respect to a wafer, the multiple instances may be located as shown in FIG. 4 on other specimens as well. Multiple dies are shown formed on the wafer in a manner that does not necessarily reflect the arrangement of dies on an actual wafer. Instead, the different dies are shown in FIG. 4 simply to illustrate the different locations that the multiple instances of a POI may have within a die.

In one such example, in die 402 shown in FIG. 4, multiple instances 406 of one type of POI are shown. In particular, each of the POIs described herein may be formed in multiple locations or "instances" within a die on the specimen. In addition, there may be different types of POIs within a die on the specimen, and each of the different types may appear at different (one or more) locations within the die. In die 402, multiple instances 406 are for only one type of POI.

As further shown in FIG. 4, multiple instances 406 are not located at periodic locations within die 402. In particular, multiple instances 406 do not appear at regularly spaced intervals along either dimension (e.g., the x or y dimension). In this manner, the multiple instances of the POI are not equivalent to cells in an array region of a die that are formed at periodic locations in both x and y dimensions. In addition, the multiple instances of the POI are not equivalent to fields within a die where each field size is on the order of a few microns and all fields are expected to lie on the same coordinates in one dimension within a die. Instead, the POIs may be much smaller than a field size (e.g., on the order of a single feature or polygon in the die or even only a portion of a single feature or polygon in the die). In particular, while a field size my be on the order of a few microns, a typical POI size may be on the order of only a few nanometers. In addition, the POIs do not necessarily lie along the same coordinates in one dimension in the die. The multiple instances of the POI may be therefore located randomly throughout the die in both dimensions (although the multiple instances of the POI are not necessarily random in that their locations are dictated by the design for the die).

As further shown in FIG. 4, multiple instances 406 may be located in die 402 but not die 404 on the specimen. In particular, as described further herein, the computer subsystem(s) may perform the outlier detection described herein for only a single die on the specimen. Therefore, the multiple instances of a POI that are used for identifying outlier(s) may include only the multiple instances of a POI in one die on the specimen (e.g., die 402) and not other dies on the specimen (e.g., not die 402). However, the outlier identification described herein may be performed by the computer subsystem(s) separately for different dies on the specimen e.g., on a die-by-die basis). In this manner, outlier detection may be performed using multiple instances 406 in die 402, then outlier detection may be performed using multiple instances (not shown) in die 404. If the outlier detection is performed separately for different dies, then the same within die coordinates of multiple instances of a POI may be used for each of the different dies. For example, if outlier detection is to be performed for die 404 based on the same type of POI formed at multiple instances 406 in die 402, then the same within die locations of the multiple instances may be used for outlier detection performed for die 404.

As described further herein, the outlier detection may be performed separately for different POIs, and the different POIs may be located in the same die. For example, as shown in die 408 in FIG. 4, outlier detection may be performed for die 408 and one POI type formed at multiple instances 406. Outlier detection may also be performed for die 408 and a different POI type formed at multiple instances 410. Multiple instances 406 may be arranged within die 408 as described further herein. Multiple instances 410 of the second POI type may be arranged in the same manner within die 408 as described with respect to multiple instances 406 (e.g., at aperiodic locations in one or both dimensions, at seemingly random locations, at locations dictated by the design for the die, etc.). In addition, outlier detection may be separately performed for any one die any number of times depending on the number of different types of POIs for which the outlier detection will be performed. In other words, outlier detection may be performed separately two or more times for two or more different types of POIs located in the die.

As further described herein, the outlier detection may be performed on a field basis. For example, as shown in FIG. 4, die 412 may include two different fields 414 and 416 (although a die may include any suitable number of fields located within the die in any suitable arrangement). Outlier detection may be separately performed for each of the fields or only some of the fields. For example, as shown in FIG. 4, outlier detection may be performed for field 414 and one type of POI located at multiple instances 418 while outlier detection may not be performed for field 416 (hence, no multiple instances are shown in field 416). Outlier detection may otherwise be performed for the fields as described herein on a POI-by-POI basis such that for any one field, outlier detection may be performed separately for different POIs; on a field-by-field basis such that outlier detection is performed separately for different fields; etc.).

The computer subsystem(s) are also configured for determining a feature of each of the images generated at the multiple instances of the POI. The feature may consist of a single value or may include an ordered set of a multiplicity of values, i.e., a vector. The feature may be, for example, the gray scale values of the image that are output in a raster order into a vector. However, any suitable image feature can be determined and used in the embodiments described herein. For example, other features that can be determined and used in the embodiments described herein include, but are not limited to, local gradients of gray level values in the x and/or y directions, averages over a neighborhood of pixels (e.g., 3 pixels by 3 pixels), etc. In addition, more than one feature may be determined for each of the images generated at the multiple instances of the POI.

The computer subsystem(s) are further configured for identifying one or more outliers in the multiple instances of the POI based on the determined features. Identifying the one or more outliers may include rejection or deviation scoring based outlier analysis for each POI, which may be performed as described further herein.

In one embodiment, the one or more computer subsystems are configured for separately performing acquiring the images, determining the feature, and identifying the outlier(s) steps for a different POI within the die formed on the specimen. For example, as described further herein, in any one die, there may be more than one type of POI. There may also be one or more instances of each type of POI in a die. In addition, it may be desirable to perform outlier detection for more than one type of POI. Therefore, the outlier detection described herein may be performed separately for different types of POIs. For example, outlier detection may be performed for a first type of POI using only the images generated at the multiple instances of the first type of POI, outlier detection may be performed for a second type of POI using only the images generated at the multiple instances of the second type of POI, and so on.

In one such embodiment, the multiple instances of the POI and the different POI cover a majority of the die. For example, a user or the computer subsystem(s) may determine from the design of a die, a number of POI that sufficiently covers the die, with a substantial number of each POI type. It may be important to have such coverage so that the inspection is essentially equivalent to a full die inspection. It may also be important to have a substantial quantity of each POI type to provide for relatively high confidence outlier analysis results. In addition, the multiple instances of the POI that are used for outlier detection may include every single instance of the POI in a die (or other area for which outlier detection is being performed) or fewer than every single instance of the POI in the die (or other area), e.g., if not every instance of the POI is needed to provide statistically significant information for the outlier detection.

In another embodiment, determining the feature and identifying the outlier(s) do not include generating a difference image from two or more of the images generated at the multiple instances of the POI. Therefore, one advantage of the embodiments described herein is that they can determine outliers on a relatively large population of POI images, without resorting to differencing. Thus, unlike methods and systems in which common mode defect mechanisms cancel each other out between reference and test images for a POI, issues of common mode cancellations do not arise for detection of outliers in POIs. In addition, since the embodiments described herein can perform outlier detection without generating difference images for a POI, the population of POI images used for the outlier detection described herein do not need to be generated in more than one die on the specimen. In this manner, the population of POI images used for the outlier detection described herein may be restricted to only those generated at locations within a single die. In this manner, the outlier detection described herein may be inherently equivalent to intra-die inspection.

In an additional embodiment, the computer subsystem(s) are configured for receiving information for the POI and identifying all of the multiple instances of the POI in the die based on the information. For example, before analyzing for outliers from images, one or more steps may be performed on a set of dies (or one or more dies) on a wafer, a complete wafer (i.e., all of the dies on a wafer), or a lot (i.e., one or more dies on one or more wafers in a lot). In one such example, a user may mark POI on the design layout. A plurality of POIs or different types of POIs can be marked. The computer subsystem(s) described herein may receive such information in any suitable manner. The computer subsystem(s) may then use an automated pattern search software tool to find all locations of each POI in the die (or other area for which the outlier detection is to be performed). These locations may then be marked in the inspection recipe for the specimen such that during scanning of the specimen, images are acquired at the POI locations. In this manner, the embodiments described herein provide a method by which POIs can be identified automatically, which advantageously takes much less time than the time-consuming manual task of identifying the POIs.

In one embodiment, the one or more computer subsystems include a computer subsystem of an electronic design automation (EDA) tool. For example, for POI identification, the computer subsystem(s) may use EDA physical design analysis tools or apply custom algorithms to the physical design. The EDA tool may include any suitable commercially available EDA tool. In some such embodiments, one or more of the computer subsystems described herein (e.g., computer subsystem(s) 102) may be configured as an EDA tool.

In a further embodiment, the computer subsystem(s) are configured for performing acquiring the images, determining the feature, and identifying the outlier(s) for a combination of the multiple instances of the POI within the die and at least one additional instance of the POI within at least one additional die on the specimen. For example, the embodiments described herein may perform the functions described herein for more than one die on a wafer or a complete wafer (i.e., all of the dies on the wafer).

In some embodiments, the one or more computer subsystems are configured for performing acquiring the images, determining the feature, and identifying the outlier(s) for a combination of the multiple instances of the POI within the die and at least one additional instance of the POI on at least one additional specimen. For example, the embodiments described herein may perform the functions described herein for a lot of wafers (or any set of more than one wafer and any one or more dies on the more than one wafer).

In another embodiment, identifying the outlier(s) includes identifying and discarding one or more of the images having one or more extreme values for the feature determined for each of the images, determining a central tendency measure for remaining images, scoring all of the images based on deviation of their feature values from the central tendency measure, and identifying the one or more outliers based on results of scoring. For example, it may be assumed that the values of the feature have a single unimodal distribution like a single multivariate Gaussian, and outliers may be defined with respect to this distribution. Therefore, outlier ranking may be performed with respect to this distribution. One procedure that can be used to perform this ranking includes identifying and discarding outliers and/or trimming extreme values. Then, a central tendency measure (like mean or median) for the data that remain may be determined. This may be performed using robust regression. All data, inclusive of the discarded data, may then be scored based on their deviation from the central measure. The deviation scores may then be used for outlier ranking, where a higher deviation score indicates a greater chance of being an outlier.

The instances of the POIs that are identified as outlier(s) may then be determined based on their outlier ranking. For example, the computer subsystem s) may be configured to identify a predetermined percentage of the instances of the POIs having the highest deviation scores as the outlier(s). Alternatively, the computer subsystem(s) may be configured to identify the instances of the POIs having a deviation score greater than a predetermined threshold as the outlier(s). The outlier(s) may be identified based on the deviation scores in any other suitable manner.

In a further embodiment, identifying the outlier(s) includes determining rejection or trimming scores for all of the images based on one or more values for the feature determined for each of the images and identifying the one or more outliers by applying a threshold to the rejection or trimming scores. For example, as described above, some embodiments may include a step for identifying and discarding outliers and/or trimming extremes. In order to identify outliers for rejection or extreme values for trimming, one can score all data with rejection/trimming scores and use these rejection scores in conjunction with a threshold for rejection or trimming. If the power of these rejection scores is believable, then outlier ranking can be performed even before a robust central measure is determined and deviation scores are employed. In other words, a good rejection scoring method can be used to detect outliers on the fly, and it may be unnecessary to perform the subsequent step of deviation scoring. In this manner, the embodiments described herein may be configured for rejection scoring for on-the-fly outlier analysis.

In an additional embodiment, the computer subsystem(s) are configured for, prior to determining the feature, reducing image artifacts in the acquired images caused by the imaging subsystem or the specimen. For example, the computer subsystem(s) may be configured for preprocessing the POI. image data acquired at the POI locations identified as described herein. In particular, before any outlier scoring methods are applied, the image data in the POI may be pre-processed in order to eliminate all (or one or more of) image artifacts generated by the imaging subsystem and/or the specimen. A few of these can be calibrated out. These include but may not be limited to those described further herein.

In one such example, the image artifacts may include aberration/geometric distortion. For example, a "barrel" or "pin-cushion" distortion of an image or its stretch in a particular direction is often calibrated on an inspection tool. If such a calibration exists, then an inverse geometric transformation can be used to correct for the distortion by re-sampling the image. Generating and using such a calibration may be performed in any suitable manner known in the art.

In an additional example, the image artifacts may include sensor/tap response non-uniformity. For example, each tap or pixel of the detector (e.g., a TIN sensor) that records the image on the imaging subsystem may have its own individual gain and offset setting. While it is the responsibility of calibration to make sure that these individual gains and offsets are set such that the response from all of the TDI sensors is the same when presented with the same input, non-uniformity can exist. This non-uniformity may not currently affect defect detection that severely because of the common mode nature of die-to-adjacent die defect detection mechanisms. However, if severe enough, this non-uniformity will affect the outlier detection described herein. Therefore, modifying the images to account for such image artifacts can have a significant impact on the outlier detection results described herein.

In a further example, the image artifacts may include focus drifts in the imaging subsystem. For example, there may be focus drifts on the imaging subsystem that are identified and corrected for on the fly. The focus drifts may be corrected in any suitable manner known in the art.

In yet another example, the image artifacts may include thin film interference effects on the recorded image. For example, thin film interference effects on the specimen can cause color and polarity to change on the recorded image. Algorithmically, one can correct for this effect by adjusting local gain and offsets, which may be performed in any suitable manner known in the art.

In one embodiment, the images generated by the imaging subsystem are patch images. For example, the images generated by the imaging subsystem and acquired and used by the computer subsystem(s) may be relatively small images and relatively small portions of all of the image data generated by the imaging subsystem while scanning the specimen. In one such example, a swath of images generated by scanning the specimen may include many frames of image data. Each of the frames may include many patch images. For example, a frame of image data may include hundreds of pixels (e.g., about 512 pixels by 512 pixels) while a patch image may include only tens of pixels (e.g., less than 10 pixels by less than 10 pixels). Therefore, relatively small portions of all of the images generated by scanning the specimen may be used as the images described herein. The patch images generated at the multiple instances of the POI may be extracted from the image data generated by the imaging subsystem in any suitable manner.

In one such embodiment, the computer subsystem(s) are configured for, prior to determining the feature, identifying a sub-image in one of the patch images generated at one of the multiple instances of the POI, aligning the sub-image to each of the patch images generated at the multiple instances of the POI, and identifying a sub-image in each of the patch images generated at the multiple instances of the POI that corresponds to the POI based on results of the aligning, and the feature of each of the images is determined based on only the sub-images in each of the images. These steps may be performed prior to outlier analysis. Therefore, the computer subsystem(s) may be configured to perform, for a POI, algorithmic steps prior to outlier analysis. In one such example, for a given optical patch image, the computer subsystem(s) may identify a sub-image within the patch image that corresponds to the POI and the sub-image may be cut out or extracted from the patch image. Identifying the sub-image within a patch image that corresponds to the POI may be performed based on design information for the POI (e.g., information for polygons included in the POI), which may be used to search in the patch image for the sub-image. This sub-image may then be used as the golden POI image. The term "golden" is used herein to refer to a defect-free sub-image that can be used as a representative of a population of POI images and which can be used as a template to align the rest of the population of images in subsequent steps. If the POI occurs in different orientations, each such orientation may be processed separately. This step may be performed during setup.

In this manner, the computer subsystem(s) may create a golden POI image as the template image. Given an optical patch image containing the POI as a sub-image, the computer subsystem(s) can determine the location of this POI sub-image within the patch image by performing image matching. A template for each POI orientation may be used. For example, the computer subsystem(s) may be configured for performing template matching on every patch image using the golden POI image. Prior to template matching, the computer subsystem(s) may enlarge each patch image by a certain scale to a. correspondingly enlarged golden POI image using normalized cross correlation, which may be performed in any suitable manner known in the art. The enlargements allow for sub-pixel corrections. The template matching reduces any residual alignment errors that may remain after initial alignment. The results from the template matching on the enlarged images may be used to perform sub-pixel interpolation on the patch images and to extract the sub-image of the POI from the patch images. The sub-pixel interpolation may be performed to return the enlarged POI image back to its original size. The sub-pixel interpolation may also math the POI. image size to the design pixel size. In addition, sub-pixel interpolation allows a smoother rendering.

After the sub-image of the POI has been extracted, any pre-processing described herein may be performed on every sub-pixel interpolated POI image. This pre-processing can be performed to reduce any variations between each of the POI images and the golden POI image. By transitivity, all POI images will be equivalent. The computer subsystem(s) may then perform feature extraction described further herein from the POI images. As described further herein, rejection- or deviation-based outlier scoring may use these features to produce a rejection or deviation score for that POI.

In another embodiment, computer subsystem(s) are configured for identifying the multiple instances of the POI that have different patterns surrounding the POI based on the determined features or another feature determined for each of the images. For example, the "noise" caused by the effects of the immediate geometry surrounding a POI can be fully analyzed by the embodiments described herein. In one such example, two identical POI lying in two different locations in a die but having different surrounding geometry may have different "noise" characteristics due to the differing geometries. These differences cannot be picked up by adjacent die difference analysis. However, the embodiments described herein will allow the detection of this difference.

Identifying different instances of the POI that have different noise characteristics due to different surrounding geometries may be performed for a number of applications. For instance, systematic "defect" mechanisms due to different surrounding design patterns can be identified by this sort of analysis. In particular, the same POI can be affected differently by different surrounding patterns. Therefore, POIs that have significant changes due to these local differences could show up as outliers.

The embodiments described herein can be used for a variety of review and/or metrology applications. The different methods by which the outliers can be selected for review or metrology and which can in turn affect the choice of outliers are described further herein.

In one embodiment, the computer subsystem(s) are configured for identifying one or more regions in the POI having more noise than other regions in the POI based on results of identifying the outlier(s) and repeating identifying the outlier(s) based on the determined features and weights for the identified one or more regions. In this manner, the embodiments described herein may be configured for region of interest (ROI) sensitized POI outlier detection. For example, from the POI outlier detection results generated by the computer subsystem(s) described herein, ROIs inside the POI having relatively large noise can be picked up, which may be performed in any suitable manner known in the art. These ROIs may be sent back to a user for review (e.g., by displaying information for the ROIs on a display device or by storing the information in a storage medium that is accessible to the user). The user may discard those ROIs that are not of interest and can change some. The computer subsystem(s) may receive from the user those ROIs that are of interest, which may be performed in any suitable manner. Those ROIs may be sent back for a ROI sensitized POI outlier detection, in which the noisy pixels are strongly weighted in the outlier scoring mechanism. In this manner, the embodiments described herein may be configured for ROI sensitized POI outlier detection with user feedback.

In some embodiments, the computer subsystem(s) are configured for identifying one or more regions in the POI having more noise than other regions in the POI based on results of identifying the outliers(s) and selecting the identified one or more regions as measurement sites for a metrology process performed on the specimen. For example, the embodiments described herein can be used to find outlier trends in a specimen (e.g., a wafer) and point a review or metrology tool to a relatively small subset of locations for review or metrology. In this manner, the embodiments described herein may be configured for POI outlier analysis assisted metrology. In one such example, from results of the POI outlier detection, ROIs in the POI having relatively large noise may be picked up, which may be performed in any suitable manner known in the art. These ROIs may be sent to a metrology tool for analysis (e.g., by sending information for the ROIs to a metrology tool). The metrology tool may include any suitable metrology tool known in the art such as a metrology tool that is commercially available from KLA-Tencor.

The metrology tool user or the computer subsystem(s) may determine from the ROIs what measurements to capture and where. For example, in one such embodiment, the computer subsystem(s) are configured for determining one or more parameters of measurements performed at the measurement sites during the metrology process based on the identified one or more regions. In this manner, the embodiments described herein can be configured for automatically identifying the POIs at which measurements are to be performed as well as determining the geometrical measurements that are to be performed on the design structures in a particular POI. Therefore, the embodiments described herein can eliminate the time-consuming manual task of identifying the POIs and what geometrical measures are to be performed on the design structures in a particular POI. The one or more parameters of the measurements performed at the measurement sites during the metrology process may be further determined as described in U.S. patent application Ser. No. 14/918,394 by Duffy et al. filed Oct. 20, 2015, which is incorporated by reference as if fully set forth herein. The embodiments described herein may be configured to perform any step(s) performed by any system(s) described in this patent application.

In another embodiment, the computer subsystem(s) are configured for: determining a function that describes a correlation between the feature or another feature of the images generated at the multiple instances of the POI and results of a metrology process performed on the specimen; and identifying one or more additional outliers in the multiple instances of the POI based on the feature or the other feature and the function. The other feature may include any of the image features described further herein. In this manner, the embodiments described herein may be configured for metrology assisted POI outlier scoring. For example, from a relatively small sample of meteorological data, a POI outlier scoring function may be trained to produce a metric—a function of the POI image data that correlates well with an overall metrology score. This POI outlier scoring function can then be used for the rejection or deviation based scoring of outliers. In other words, the computer subsystem(s) may determine a correlation (or function) between 1) some feature(s) of the POI image data and 2) metrology results. That correlation (or function) can then be used to identify outliers based on solely the feature(s) of the POI image data. In this manner, the embodiments described herein can be configured for learning and modifying POI outlier scores based upon feedback from a metrology tool. In addition, the feature(s) that are used for rejection or deviation scoring based outlier detection by the embodiments described herein may be different from or the same as the feature(s) that are used for outlier detection based on a correlation to metrology results.

In an additional embodiment, determining the feature includes generating difference images for each of the images by subtracting a reference image generated from a different die formed on the specimen from each of the images and determining the feature of each of the images from its corresponding difference image. For example, the embodiments described herein are not limited to any particular set of image populations. Currently used methods for defect detection include analyzing differences between images from adjacent dies. The rejection or deviation scoring methods described herein can be applied to adjacent die difference image populations or subpopulations restricted to the POI.

In a further embodiment, the computer subsystem(s) are configured for performing acquiring the images, determining the feature, and identifying the outlier(s) for one or more additional dies formed on the specimen and comparing results of identifying the outlier(s) for the die and the one or more additional dies to identify which of the die and the one or more additional dies are outliers. For example, by aggregating the rejection or deviation scores of the POI images arising from a die, outlier tendencies of dies can be identified. As described further herein, identifying outlier(s) may be performed separately for different POIs. Therefore, for any one die, there may be different outlier results generated for different POIs, respectively. The rejection or deviation scores that are aggregated for multiple dies may include only the rejection scores for one type of POI. Different aggregations may, however, be separately generated based on the rejection scores for different types of POIs, respectively. Therefore, the aggregations may be performed on a POI-by-POI basis such that different aggregated rejection scores are determined for different types of POIs.

Figure 5:
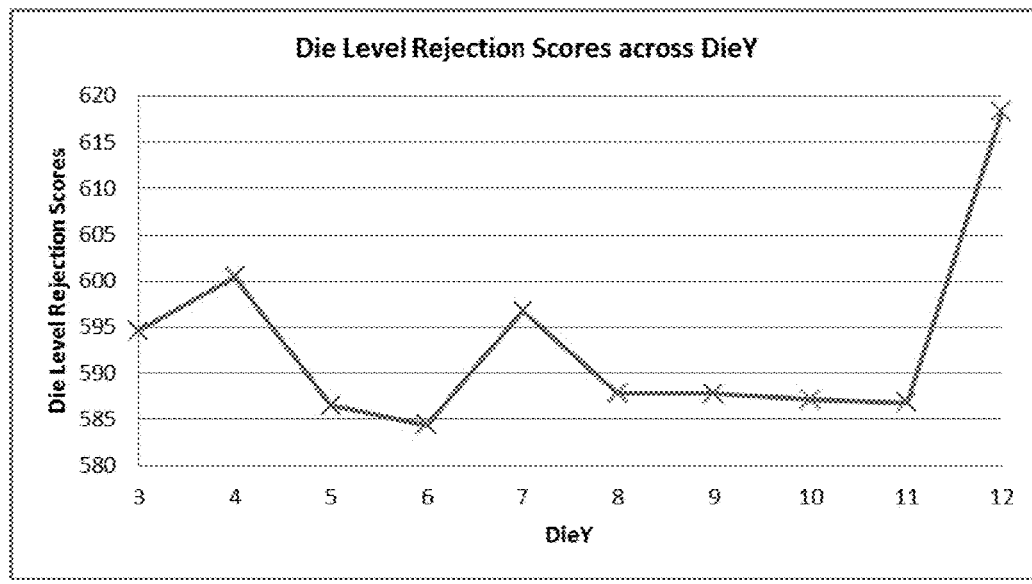
FIG. 5 is a graph showing one example of results of identifying one or more outliers as described herein for multiple dies on a specimen and how those results can be used to identify outliers in the dies.

The result of such an experiment is shown in FIG. 5. The graph shown in this figure shows the average value of POI rejection scores on a set of 10 dies in one column of a semiconductor wafer. The x-axis is an ordinal number denoting the row index of each die. The y-axis denotes the average of the rejection scores of the POIs of that die. FIG. 5 clearly shows the outlier behavior of the extreme die 12. In this manner, the embodiments described herein can be configured for detecting inter-die deviations across a specimen.

In another embodiment, the die is a single instance of multiple dies formed on the specimen, and the multiple instances for which acquiring the images, determining the feature, and identifying the outlier(s) are performed are located only within the single instance of the multiple dies. For instance, the population of POI images may be restricted to be within one die. In such embodiments, therefore, it is inherent that determining outliers in this population is equivalent to performing intra-die inspection. In addition, one of the major applications of the embodiments described herein is for intra-die inspection. In contrast, it is currently impossible to perform intra-die inspections with the current methodology of analyzing differences between adjacent dies, because those methods must by definition involve a plurality of dies. The importance of intra-die inspection is that defects that are not picked up due to the common modes existing between adjacent dies can now be detected. In other words, the outlier detection described herein may detect defects that cannot otherwise be detected by currently used die-to-die detection.

In a further embodiment, the die is the only die formed on the specimen. For instance, since the embodiments described herein can perform intra-die inspection, the embodiments may be particularly useful for inspection of specimens that only have a single die formed thereon (e.g., single die reticles).

One can generalize the concept of aggregating the rejection or deviation scores of the POI images for outlier detection over any subpopulations of POI images. For example, the methods may be die-based as described herein. However, in some embodiments, the multiple instances of the POI are located within only one of multiple reticle fields within the die formed on the specimen. For example, as shown in FIG. 4, multiple instances 418 of a POI are located within only one of multiple reticle fields 414 and 416 in die 412 formed on specimen 400. In other words, although multiple instances may be formed in both of the reticle fields shown in die 412, the multiple instances of the POI that are used for the outlier detection described herein may be only those located in one of the reticle fields. For example, the sub-populations can be split into a 2D grid superimposed on each reticle field. In this way, the intra-field deviations in the design pattern can be observed across a reticle field. In this manner, the embodiments described herein can be configured for detecting intra-field deviations across a reticle field. Inter-field deviations can also be detected by the embodiments described herein in the same manner as described with respect to detecting inter-die outliers.

Figure 6:
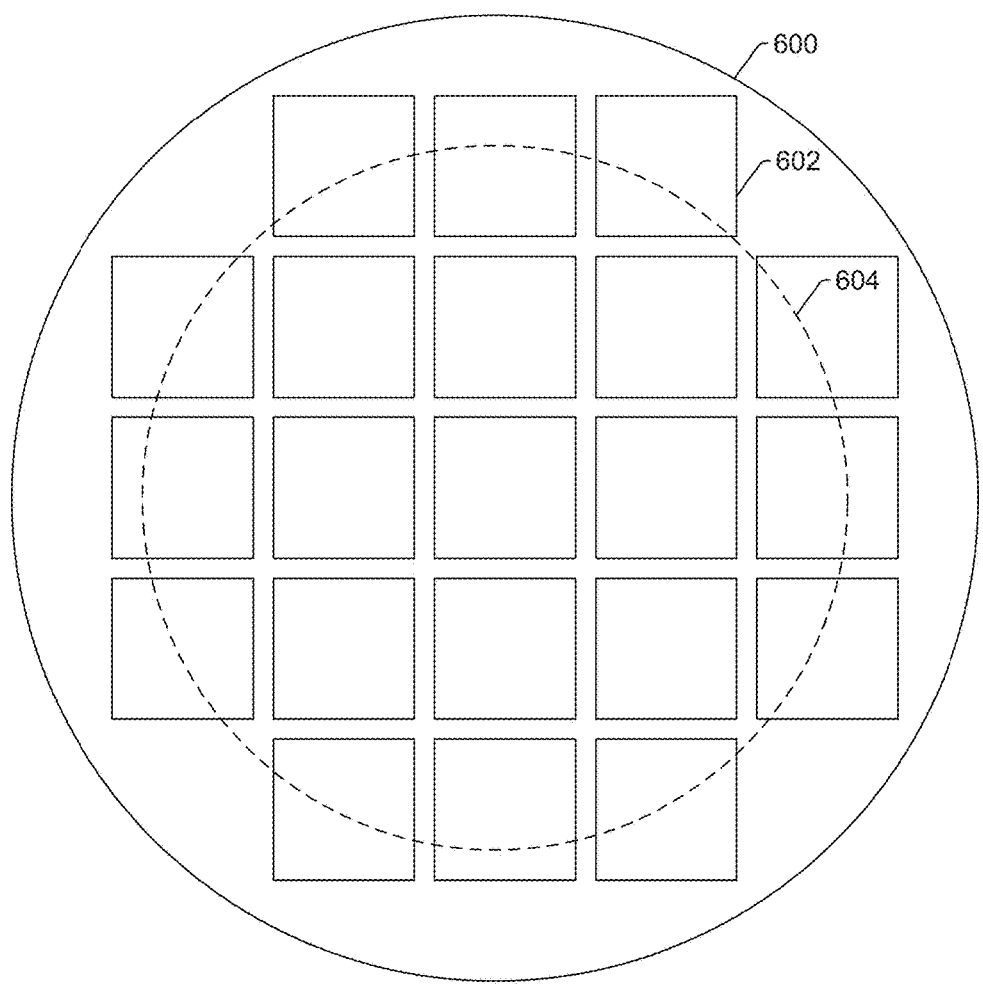
FIG. 6 is a schematic diagram illustrating a plan view of one embodiment of at least portions of multiple dies formed on a specimen located in a region on the specimen.

In an additional embodiment, at least a portion of the die and at least a portion of an additional die formed on the specimen are located in a region on the specimen, and the multiple instances of the POI for which acquiring the images, determining the feature, and identifying the outlier(s) are performed are located in at least the portion of the die and at least the portion of the additional die. For example, the embodiments described herein may be specimen-location based, e.g., for a sector or annular region on the specimen. in one such example, a chemical mechanical polishing (CMP) brushing artifact may cause a ring (annular) defect signature to be created on a wafer, as shown in FIG. 6. In particular, as shown in FIG. 6, wafer 600 may include a number of dies 602 formed thereon. A defect signature may be located on wafer 600 in the area between imaginary boundary 604 and the outer edge of the wafer, which define an annular area or "ring" extending inward from the outer edge of the wafer. In other words, defects (or significantly more defects) may be located in the annular region of the specimen that are not located in other regions of the specimen.

As further shown in FIG. 6, the region between imaginary boundary 604 and the outer edge of the wafer may include different portions of multiple dies on the wafer. Therefore, when analyzing this region for outlier detection, the multiple instances of the POI that are used for the outlier detection may include any (or all) of the instances of the POI in the portions of the dies located between boundary 604 and the outer edge of the wafer. In this manner, the multiple instances of the POI that are used for outlier detection may not be restricted to any one die or field on the specimen, but instead may include any (or all) of the instances of the POI located within any arbitrary region of interest on the specimen in which outlier detection is to be performed.

Depending on the configuration of the region of interest the specimen, the coordinates that are used for the multiple instances of the POI may vary. For example, the signature shown in FIG. 6 may be detected with polar coordinate-based aggregation of POI rejection or deviation scores.

In this manner, the embodiments described herein may be configured for detecting specimen sector and/or annular deviations across a specimen. The aggregations performed for a region on the specimen may otherwise be performed as described further herein (e.g., different aggregations may be performed for different types of POIs on a POI-by-POI basis and/or the rejection or deviation scores for more than one type of POI are not aggregated together into a single value).

Another embodiment relates to a computer-implemented method for identifying outliers in multiple instances of a POI on a specimen. The method includes the steps described above.

Each of the steps of the method may be performed as described further herein. The method may also include any other step(s) that can be performed by the imaging subsystem and/or computer subsystem(s) or system(s) described herein. The steps are performed by one or more computer systems, which may be configured according to any of the embodiments described herein. In addition, the method described above may be performed by any of the system embodiments described herein.

Figure 7:
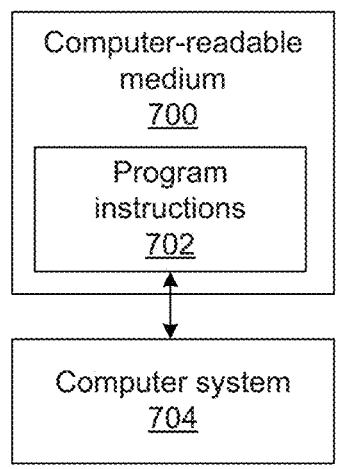
FIG. 7 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for identifying outliers in multiple instances of a POI on a specimen. One such embodiment is shown in FIG. 7. In particular, as shown in FIG. 7, non-transitory computer-readable medium 700 includes program instructions 702 executable on computer system 704. The computer-implemented method may include any step(s) of any method(s) described herein.

Program instructions 702 implementing methods such as those described herein may be stored on computer-readable medium 700. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 704 may be configured according to any of the embodiments described herein.

Further modifications and alternative embodiments of various aspects of the invention will be apparent to those skilled in the art in view of this description. For example, methods and systems for identifying outliers in multiple instances of a pattern of interest are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to identify outliers in multiple instances of a pattern of interest on a specimen, comprising:
an imaging subsystem comprising at least an energy source and a detector, wherein the energy source is configured to generate energy that is directed to a specimen, and wherein the detector is configured to detect energy from the specimen and to generate images responsive to the detected energy; and one or more computer subsystems configured for:
acquiring images generated by the imaging subsystem at multiple instances of a pattern of interest within a die formed on the specimen, wherein the multiple instances comprise two or more instances that are located at aperiodic locations within the die;
determining a feature of each of the images generated at the multiple instances of the pattern of interest; and
identifying one or more outliers in the multiple instances of the pattern of interest based on the determined features.

2. The system of claim 1, wherein the one or more computer subsystems are further configured for separately performing said acquiring, said determining, and said identifying for a different pattern of interest within the die formed on the specimen.

3. The system of claim 2, wherein the multiple instances of the pattern of interest and the different pattern of interest cover a majority of the die.

4. The system of claim 1, wherein said determining and said identifying do not comprise generating a difference image from two or more of the images generated at the multiple instances of the pattern of interest.

5. The system of claim 1, wherein the one or more computer subsystems are further configured for receiving information for the pattern of interest and identifying all of the multiple instances of the pattern of interest in the die based on the information.

6. The system of claim 1, wherein the one or more computer subsystems are further configured for performing said acquiring, said determining, and said identifying for a combination of the multiple instances of the pattern of interest within the die and at least one additional instance of the pattern of interest within at least one additional die on the specimen.

7. The system of claim 1, wherein the one or more computer subsystems are further configured for performing said acquiring, said determining, and said identifying for a combination of the multiple instances of the pattern of interest within the die and at least one additional instance of the pattern of interest on at least one additional specimen.

8. The system of claim 1, wherein said identifying comprises identifying and discarding one or more of the images based on one or more extreme values of the feature determined for each of the images, determining a central tendency measure for remaining images, scoring all of the images based on deviation of their feature values from the central tendency measure, and identifying the one or more outliers based on results of said scoring.

9. The system of claim 1, wherein said identifying comprises determining rejection or trimming scores for all of the images based on one or more values for the feature determined for each of the images and identifying the one or more outliers by applying a threshold to the rejection or trimming scores.

10. The system of claim 1, wherein the one or more computer subsystems are further configured for, prior to said determining, reducing image artifacts in the acquired images caused by the imaging subsystem or the specimen.

11. The system of claim 1, wherein the images generated by the imaging subsystem are patch images, wherein the one or more computer subsystems are further configured for, prior to said determining, identifying a sub-image in one of the patch images generated at one of the multiple instances of the pattern of interest, aligning the sub-image to each of the patch images generated at the multiple instances of the pattern of interest, and identifying a sub-image in each of the patch images generated at the multiple instances of the pattern of interest that corresponds to the pattern of interest based on results of the aligning, and wherein the feature of each of the images is determined based on only the sub-images in each of the images.

12. The system of claim 1, wherein the one or more computer subsystems are further configured for identifying the multiple instances of the pattern of interest that have different patterns surrounding the pattern of interest based on the determined features or another feature determined for each of the images.

13. The system of claim 1, wherein the one or more computer subsystems are further configured for identifying one or more regions in the pattern of interest having more noise than other regions in the pattern of interest based on results of said identifying and repeating said identifying based on the determined features and weights for the identified one or more regions.

14. The system of claim 1, wherein the one or more computer subsystems are further configured for identifying one or more regions in the pattern of interest having more noise than other regions in the pattern of interest based on results of said identifying and selecting the identified one or more regions as measurement sites for a metrology process performed on the specimen.

15. The system of claim 14, wherein the one or more computer subsystems are further configured for determining one or more parameters of measurements performed at the measurement sites during the metrology process based on the identified one or more regions.

16. The system of claim 1, wherein the one or more computer subsystems are further configured for: determining a function that describes a correlation between the feature or another feature of the images generated at the multiple instances of the pattern of interest and results of a metrology process performed on the specimen; and identifying one or more additional outliers in the multiple instances of the pattern of interest based on the feature or the other feature and the function.

17. The system of claim 1, wherein said determining comprises generating difference images for each of the images by subtracting a reference image generated from a different die formed on the specimen from each of the images and determining the feature of each of the images from its corresponding difference image.

18. The system of claim 1, wherein the one or more computer subsystems are further configured for performing said acquiring, said determining, and said identifying for one or more additional dies formed on the specimen and comparing results of the identifying for the die and the one or more additional dies to identify which of the die and the one or more additional dies are outliers.

19. The system of claim 1, wherein the multiple instances of the pattern of interest are located within only one of multiple reticle fields within the die formed on the specimen.

20. The system of claim 1, wherein the die is a single instance of multiple dies formed on the specimen, and wherein the multiple instances for which said acquiring, said determining, and said identifying are performed are located only within the single instance of the multiple dies.

21. The system of claim 1, wherein the die is the only die formed on the specimen.

22. The system of claim 1, wherein at least a portion of the die and at least a portion of an additional die formed on the specimen are located in a region on the specimen, and wherein the multiple instances of the pattern of interest for which said acquiring, said determining, and said identifying are performed are located in at least the portion of the die and at least the portion of the additional die.

23. The system of claim 1, wherein the feature consists of a single value.

24. The system of claim 1, wherein the feature comprises an ordered multiplicity of values.

25. The system of claim 1, wherein the specimen comprises a wafer.

26. The system of claim 1, wherein the specimen comprises a reticle.

27. The system of claim 1, wherein the energy directed to the specimen comprises light, and wherein the energy detected from the specimen comprises light.

28. The system of claim 1, wherein the energy directed to the specimen comprises electrons, and wherein the energy detected from the specimen comprises electrons.

29. A non-transitory computer-readable medium, storing program instructions executable on a computer system for performing a computer-implemented method for identifying outliers in multiple instances of a pattern of interest on a specimen, wherein the computer-implemented method comprises:

acquiring images generated by an imaging subsystem at multiple instances of a pattern of interest within a die formed on the specimen, wherein the multiple instances comprise two or more instances that are located at aperiodic locations within the die, wherein the imaging subsystem comprises at least an energy source and a detector, wherein the energy source is configured to generate energy that is directed to the specimen, and wherein the detector is configured to detect energy from the specimen and to generate images responsive to the detected energy;

determining a feature of each of the images generated at the multiple instances of the pattern of interest; and identifying one or more outliers in the multiple instances of the pattern of interest based on the determined features, wherein said acquiring, said determining, and said identifying are performed by one or more computer subsystems.

30. A computer-implemented method for identifying outliers in multiple instances of a pattern of interest, on a specimen, comprising:

acquiring images generated by an imaging subsystem at multiple instances of a pattern of interest within a die formed on the specimen, wherein the multiple instances comprise two or more instances that are located at aperiodic locations within the die, wherein the imaging subsystem comprises at least an energy source and a detector, wherein the energy source is configured to generate energy that is directed to the specimen, and wherein the detector is configured to detect energy from the specimen and to generate images responsive to the detected energy;

determining a feature of each of the images generated at the multiple instances of the pattern of interest; and identifying one or more outliers in the multiple instances of the pattern of interest based on the determined features, wherein said acquiring, said determining, and said identifying are performed by one or more computer subsystems.

* * * * *